United States Patent [19]

Day et al.

[11] Patent Number: 5,203,480
[45] Date of Patent: Apr. 20, 1993

[54] FISH STRINGER HANDLE

[76] Inventors: Charles R. Day, 2712 Bronco Trail, Duluth, Ga. 30136; G. Wayne Perrin, 714 W. 20th, Ada, Okla. 74820

[21] Appl. No.: 830,700

[22] Filed: Feb. 4, 1992

[51] Int. Cl.⁵ ............................................ A01K 65/00
[52] U.S. Cl. .................................. 224/103; 294/153; 242/85.1; 242/96
[58] Field of Search ....................... 224/103; 294/153; 242/85.1, 96

[56] References Cited

U.S. PATENT DOCUMENTS

| | | |
|---|---|---|
| 878,626 | 2/1908 | Guilford ............................ 224/103 |
| 2,455,766 | 12/1948 | Harvey ............................. 224/103 |
| 2,539,496 | 1/1951 | Towery . |
| 2,846,714 | 8/1958 | Charlick . |
| 3,137,421 | 6/1964 | Haddock . |
| 3,302,837 | 2/1967 | Montgomery . |
| 3,646,684 | 3/1972 | Paulsen ............................. 242/85.1 |
| 3,854,638 | 12/1974 | Anderson . |
| 4,004,722 | 1/1977 | Olivier . |
| 4,127,915 | 12/1978 | Logan et al. . |
| 4,656,566 | 4/1987 | Kelley . |

Primary Examiner—Linda J. Sholl
Attorney, Agent, or Firm—James A. Hinkle

[57] ABSTRACT

A fish-stringer handle has a D-shape with a channel around it for winding string to be unwound as needed for stringing fish. Finger grooves at an inside periphery of a leg of the D-shape provide comfortable handling. A needle orifice is provided for attaching the string with a fish-stringer needle. Wood or other light and floatable material can be used for construction. A string keeper can be attached to keep the string in the middle of the handle for distributing weight of fish on a string evenly across a hand of a user.

17 Claims, 3 Drawing Sheets

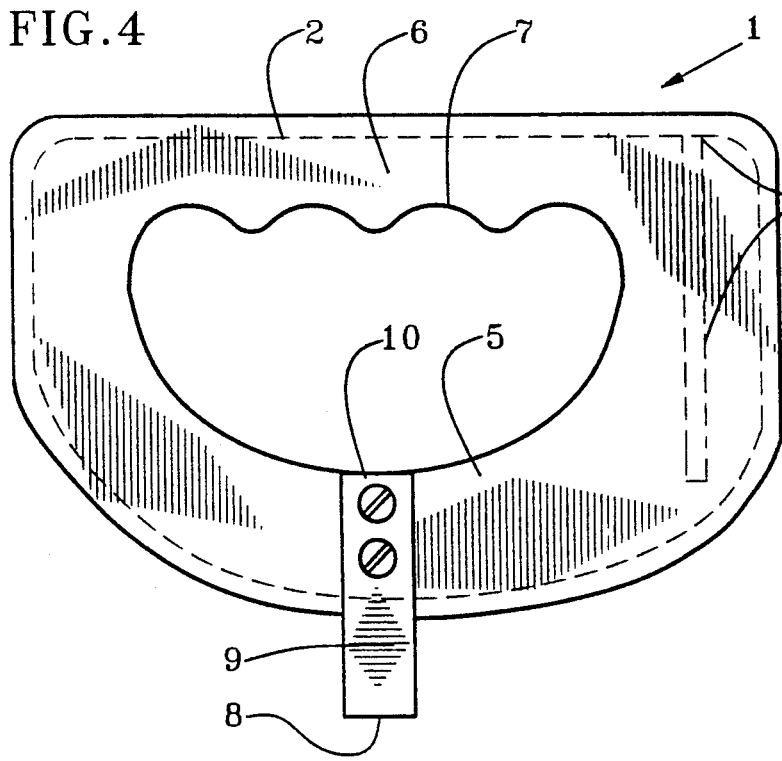
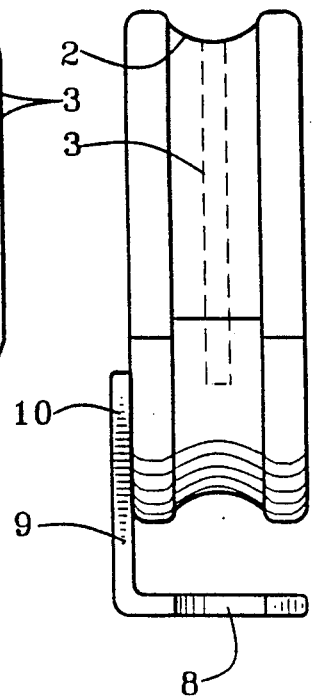
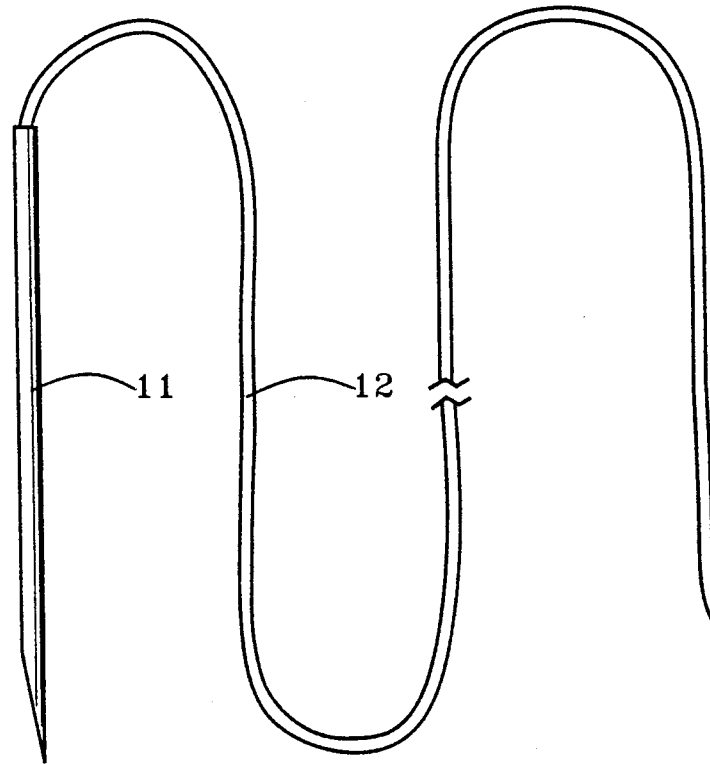

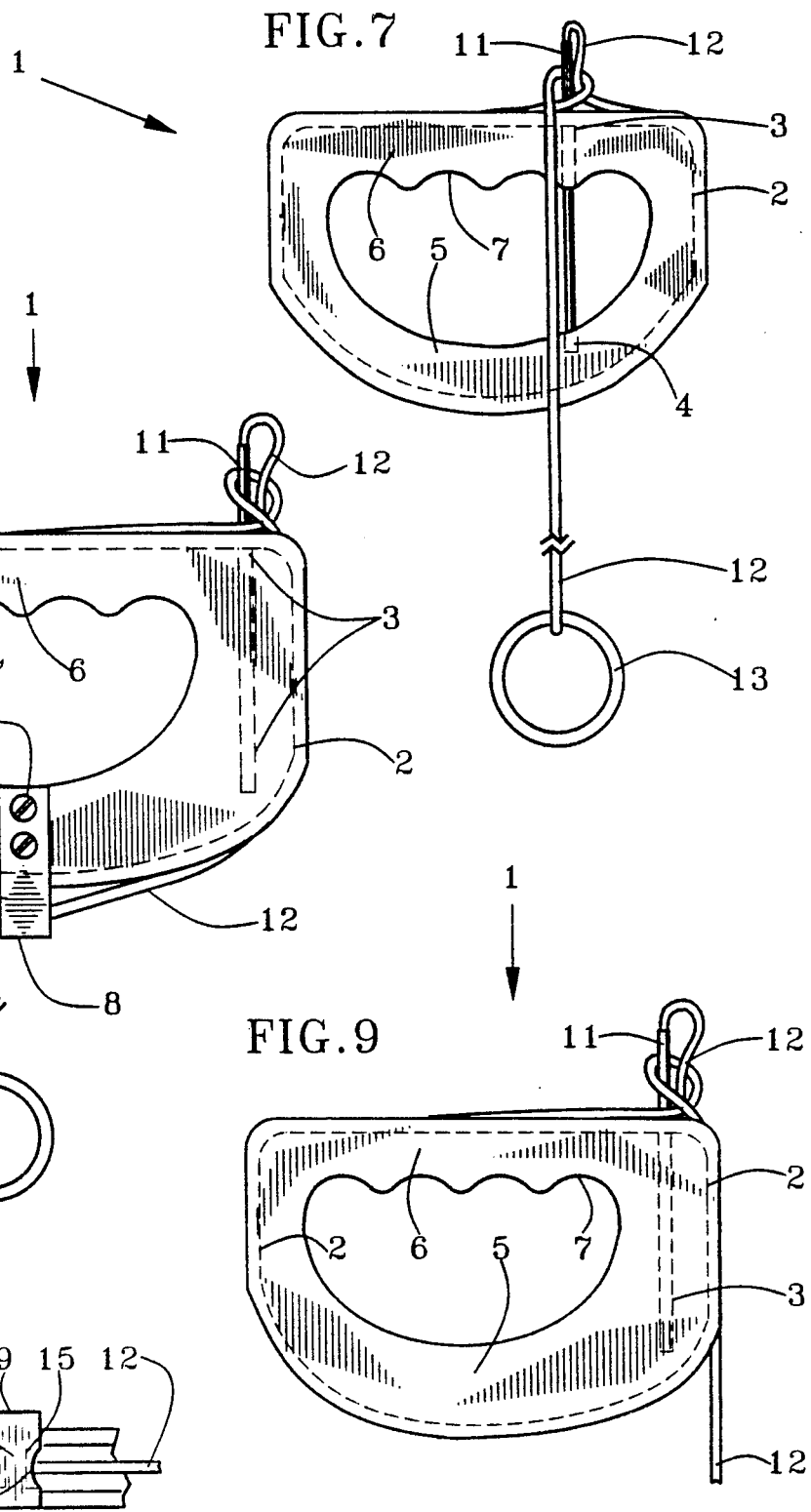

FISH STRINGER HANDLE

BACKGROUND OF THE INVENTION

1. Field of the Invention

The present invention relates generally to the field of carrying fish on a string after they have been caught.

2. Description of the Prior Art

It has long been the practice of those who fish to carry their catch of a plurality of fish on a small rope or a line generally referred to as a string. The string is threaded in through gills and out through mouths of successive fish. Historically, threading was done with a finger. A small stick was tied to one end as a handle and to the other end to keep the string from coming out of the fish. A person would then have "a string of fish."

Currently, there are a variety of fish-stringer handles, needles and strings in use. All have advantages over rudimentary stick-and-string methods. All are different from this invention and do not provide its unique advantages. Typical of prior art that is pertinent but different are the following patent documents.

| U.S. PAT. NO | DATE | NAME | CLASSIFICATION |
| --- | --- | --- | --- |
| 3,854,638 | Dec. 17, 1974 | Anderson | 224/103 |
| 3,302,837 | Feb. 7, 1967 | Montgomery | 224/103 |
| 3,137,421 | June 16, 1964 | Haddock | 224/103 |
| 2,539,496 | Jan. 30, 1951 | Towey | 224/103 |

The Anderson patent described a T-shaped handle. It was grooved across the top of the T for receiving stringing needles and down the leg of the T for receiving string. This invention, however, employs a D-shaped handle with grooves around it for wrapping string to vary its length and a different container for the stringing needle.

The Montgomery patent taught a fish carrier with a plurality of orifices for attaching string along a bottom of a metallic hanger with a handle in the center. It was not a D-shaped handle with string-wrapping channels around it as taught by this invention.

Haddock employed a handle with string attached to each end of it, different also from this invention.

The Towey device employed a snap attachment of a string at one end of a handle to which the string was attached more permanently at the opposite end of the handle It also was not the D-shaped handle with string grooves around it and a means for securing a stringing needle as a means of attaching the string to the handle as taught by this invention.

D-shaped handles have been used extensively in a structure and working relationship of parts for hand bags shopping bags, luggage, swords and a vast array of other items. But none have been structured with a channel around an outside periphery of a complete D-shape and provided with a needle-container pocket in a manner suitable for a fish-stringer handle.

SUMMARY OF THE INVENTION

In accordance with the present invention, it is contemplated that one objective of this invention is to provide a light, convenient and inexpensive fish-stringer handle.

Another objective is to provide a fish-stringer handle with a means for adjusting length of string used for stringing fish.

Another objective is to provide a fish-stringer handle with a means for containing a fish-stringing needle.

Another objective is to provide a fish-stringer handle which utilizes a conventional fish-stringer needle to attach a string of fish to a handle.

Another objective is to provide a fish-stringing handle which fits hands of users comfortably.

Another objective of this invention is to provide a fish-stringer handle which floats, rather than sinks in water when dropped.

Yet another objective of this invention is to provide a fish-stringer handle which floats as a marker in water where fish may be left on a string in the water while a person is catching more fish.

This invention accomplishes the above and other objectives with a fish-stringer handle having a D-shape with a channel around it for winding string to be unwound as needed for stringing fish. Finger grooves at an inside periphery of a base of the D-shape provide comfortable handling A needle orifice is provided for attaching the string with a fish-stringer needle. Wood or other light and floatable material can be used for construction. A keeper can be attached to keep the string in the middle of the handle for distributing weight of fish on a string evenly across a hand of a user.

Other objects, advantages and capabilities of the invention will become apparent from the following description taken in conjunction with the accompanying drawings showing preferred embodiments of the invention.

BRIEF DESCRIPTION OF THE DRAWINGS

FIG. 4 is a top plan view of an embodiment having a needle pocket positioned in a leg of a handle as illustrated in FIG. 3, but with addition of a string keeper at a bottom edge of the handle to keep string centered perpendicularly to the handle;

FIG. 5 is an end view of the FIG. 4 illustration;

FIG. 6 is a fish string with a stringer needle at one end and a fish holder at the opposite end;

FIG. 7 is a top plan view showing a side-hang method for using this invention;

FIG. 8 is a top plan view teaching a central-hang method;

FIG. 9 is a top plan view illustrating an end-hand method; and

FIG. 10 is a bottom partial sectional view of a string-keeper embodiment of this invention.

DESCRIPTION OF PREFERRED EMBODIMENTS

Figure 1:
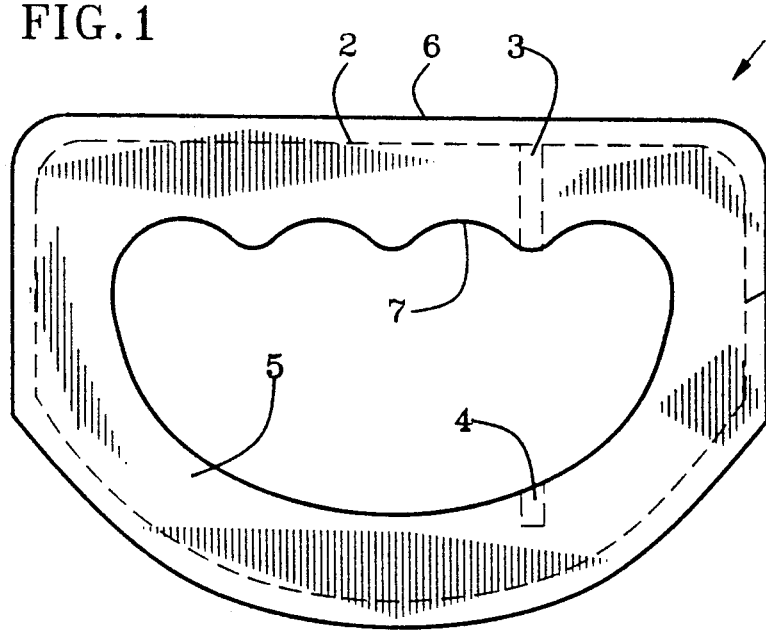
FIG. 1 is a top plan view of an embodiment of this invention having a needle pocket positioned between handle notches for a fore finger and a middle finger.
Figure 2:
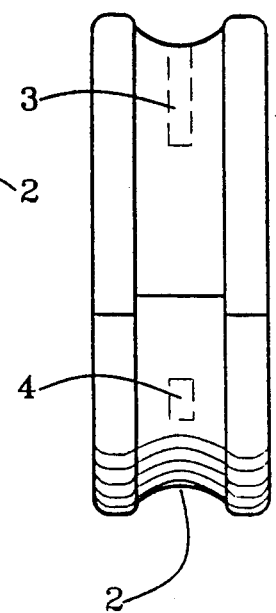
FIG. 2 is an end view of the FIG. 1 illustration.

Referring to the drawings wherein like reference numerals designate corresponding parts throughout the several figures, a D-shaped handle 1 has a string channel 2 around its outside periphery. The string channel 2 is sized and shaped to receive windings of a length of a conventional fish string which is usually approximately six feet long and about an eighth of an inch in diameter. A needle orifice 3 in a bottom of the string channel 2 is sized and shaped to receive a select linear portion of a conventional fish-stringer needle with a needle tip in a needle-tip pocket 4. The needle-tip pocket 4 is positioned in an inside periphery of a curve 5 of the D-shape. Axes of the needle orifice 3 and the needle-tip pocket 4 are concentric for an effect of a unitary pocket formed by the needle orifice 3.

Typically, a fish-stringer needle is slightly larger in diameter than the string and about four inches long. Therefore, diameters of the needle orifice 3 and the needle-tip pocket 4 are approximately one-quarter of an inch or slightly less. A leg 6 forms a grasping section of the handle 1 with an inside periphery where finger grooves 7 can be positioned. The curve 5 extends from end-to-end of the leg 6, even though portions of the curve 5 can contain surfaces which are in straight lines. In the FIG. 1 embodiment of this invention, the needle orifice 3 is positioned between first and second finger grooves where a fore finger and a middle finger of a user normally would be positioned.

Figure 3:
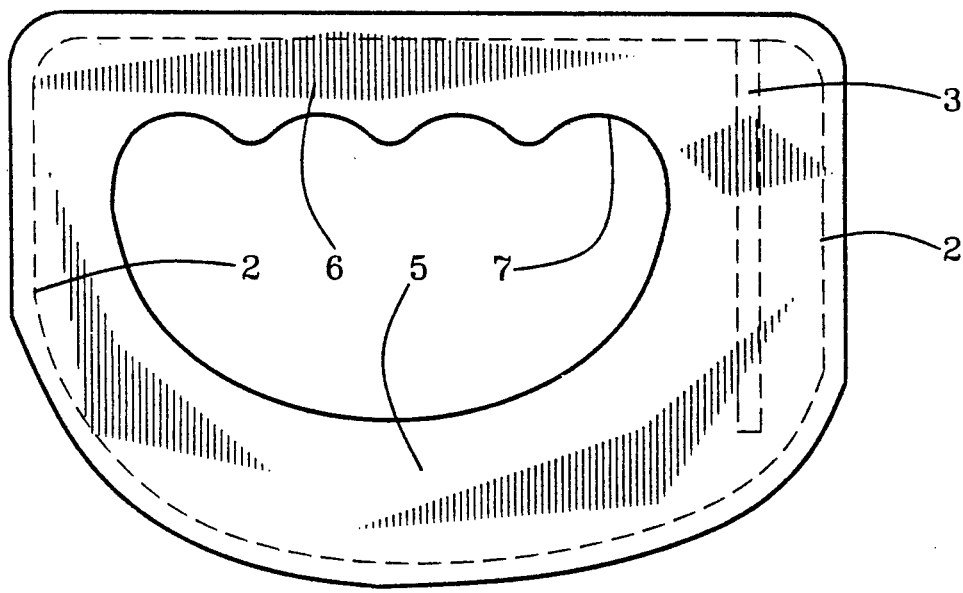
FIG. 3 is a top plan view of an embodiment having a needle pocket positioned in a leg of a handle at one side of finger grooves.

Referring to FIG. 3, the needle orifice 3 can be positioned near an end of leg 6 and extended into curve 5. In this embodiment, curve 5 is constructed slightly larger or otherwise made sufficiently strong to contain needle orifice 3 in the form of a contiguous pocket which does not position a stringer needle in contact with fingers of a user in the finger grooves 7.

Referring to FIGS. 4 and 5, the curve 5 of the D-Shape constructed sufficiently large or otherwise strong can contain a string keeper 8 on a string-keeper appendage 9 with a string-keeper base 10, including threaded or other types of fasteners, attachable to a central portion of the curve 5. The string keeper 8 can be used to support weight on a fish string at a position perpendicular to a center of the handle 1. This makes it possible for a user to carry fish without objectionable extra work to hold the handle 1 from twisting sideways or from rotating.

A wide variety of string keepers 8 and support means 9 and 10 are foreseeable. Within the intent of this invention, any structure which extends from the curve 5 and forms a string rest is some form of a string keeper, support means and base. An optional structure of the keeper 8 shown in FIG. 5 has a groove to prevent side movement of a string hanging over it. Other means to prevent side movement on various forms of the keeper 8 are foreseeable.

Material for construction of this invention can be anything which is sufficiently rigid and strong for the uses intended. However, floatable materials are preferable in order to prevent them from sinking in water associated with fishing. Floatable wood is a preferred material. Foamed material covered with a rigid coating is another. The string keeper 8 and its supporting members 9 and 10 can be made of aluminum if desired for maintaining buoyancy of the handle 1.

The curved section of the handles, indicated by numeral 5, can be made of buoyant material selectively large to provide necessary buoyancy for desired uses. One such use is marking a position on water in which fish may be attached to a fish string while a fisher continues fishing.

If floatation is not desired, then the frame of the handle 1 can be made of metal in order to be smaller. In any event, however, it is desirable to construct the handle an appropriate size for comfort of a user. Finger grooves 7 are optional. Some users may prefer them and some not.

Rounding of all edges is preferred to make this invention user-friendly. The size and shape of leg 6 of the handle includes these factors.

Referring to FIG. 6, a conventional fish string of a type intended to be used with this invention has a fish-stringer needle 11 attached to a string 12 with a fish holder means 13 at the opposite end of the string 12. The needle 11 is inserted in through gills and out through mouths of successive fish with a fish-holder means 13 being an object such as a ring with sufficiently large cross section to prevent it from being pulled through a gill of a first fish threaded on the fish string.

Referring to FIG. 7, the method for using this invention is to first, insert the stringer needle 11 into the needle orifice 3; second, wind the fish string 12 around the handle 1 in the string channel 2 at least one wind; third, loop the string around an extended portion of the needle 11 at least one wind; and then, fourth, hang the string 12 over a side or end of the handle 1.

In FIG. 8, the string 12 is positioned on string keeper 8 after being wound around the handle 1, looped around needle 11 and hung over an end of the handle 1. Winding the string 12 around handle 1 requires positioning of the string 12 under the string keeper 8 during each round of winding.

In FIG. 9, the string 12 is hung over an end of the handle 1 after being wound around the handle 1 and looped around the needle 11.

Referring to FIGS. 4, 5, 8 and 10, the string keeper 8 can be provided with a string-keeper means such as a curved groove 14 or an angled groove 15 shown with broken lines. When the string 12 hangs over the string keeper 8, it will be kept from slipping off of the string keeper 8 by walls of either groove 14 or 15. Either of these grooves can be on either or both sides of the ring keeper 8, depending on which direction string is wound. For practical purposes it is preferable to put either one or a combination of them on both sides of ring keeper 8 because users will wind their string from either direction. These grooves 14 and 15 are representative of various types of restraining means with walls parallel to a string suspended from a top of ring keeper 8 that can be employed on the ring keeper 8 within the intent of this invention.

Various modifications may be made of the invention without departing from the scope thereof and it is desired, therefore, that only such limitations shall be placed thereon as are imposed by the prior art and which are set forth in the appended claims.

What is claimed is:

1. A fish-stringer handle having:
   a D-shaped handle sized and shaped to be held with a hand at a leg of a D-shape of the D-shaped handle;
   a channel around an outside periphery of the D-shape sized to contain a select plurality of windings of fish-stringer string; and
   a needle orifice in a bottom of the channel sized and shaped to contain a fish-stringer needle at a select position in the D-shaped handle with a select portion of the fish-stringer needle projecting into and through the channel.

2. A fish-stringer handle according to claim 1 and further comprising:
   finger grooves at an inside periphery of the leg of the D-shape of the D-shaped handle.

3. A fish-stringer handle according to claim 2 wherein the needle orifice is in a bottom of the channel in a leg of the D-shape at a position in which the needle orifice terminates between a fore-finger groove and a middle-finger groove in the finger grooves.

4. A fish-stringer handle according to claim 3 and further comprising:
a needle-tip pocket in an inside periphery of a curve of the D-shape of the D-shaped handle and having an axis concentric to the needle orifice 5. A fish-stringer handle according to claim 1 wherein the material with which the fish-stringer handle is constructed is lighter than water.

6. A fish-stringer handle according to claim 1 wherein the material is wood.

7. A fish-stringer handle according to claim 4 wherein distance between the inside periphery of the curve of the D-shape and the position where the needle orifice terminates between a fore-finger position and a middle-finger position is sized to contain a sufficient portion of a select fish-stringer needle to allow only a desired portion of the select fish-stringer needle to protrude from the bottom of the channel when a tip of the select fish-stringer needle is in contact with an inside end of the needle-tip pocket.

8. A fish-stringer handle according to claim 1 wherein the curve of the D-shape of the D-shaped handle is constructed selectively for inclusion of at least on additional item.

9. A fish-stringer handle according to claim 8 and further comprising:
a string-keeper base on the curve of the D-shape of the D-shaped handle;
a string-keeper appendage extended from the string-keeper base a select distance outwardly from the channel; and
a string keeper extended from the string-keeper appendage perpendicularly to an axis of the channel proximate midway between opposite ends of the leg of the D-shaped handle such that weight of fish on a distal end of a string wound on the fish-stringer handle and resting on the string keeper is supportable perpendicularly from a central portion of the leg of the D-shape of the D-shaped handle.

10. A fish-stringer handle according to claim 1 and further comprising:
at least one restrainer means on an outside edge of the string keeper having a surface parallel to an axis of a string suspended from a top surface of the string keeper.

11. A fish-stringer handle according to claim 8 wherein the needle orifice is in a form of a pocket with an entrance at a bottom of the channel proximate an end of a leg of the D-shape and contained within an end of the curve of the D-shape of the fish-stringer handle and wherein the curve of the D-shape of the fish-stringer handle is sufficiently large to contain the needle orifice in a form of a pocket without adversely weakening the fish-stringer handle.

12. A fish-stringer handle according to claim 11 and further comprising:
a string-keeper base on the curve of the D-shape of the D-shaped handle;
a string-keeper appendage extended from the string-keeper base a select distance outwardly from the channel; and
a string keeper extended from the string-keeper appendage perpendicularly to an axis of the channel proximate midway between opposite ends of the leg of the D-shaped handle such that weight of fish on a distal end of a string wound on the fish-stringer handle and resting on the string keeper is supportable perpendicularly from a central portion of the leg of the D-shape of the D-shaped handle.

13. A fish-stringer handle according to claim 12 and further comprising:
at least one restrainer means on an outside edge of the string keeper having a surface parallel to an axis of a string suspended from a top surface of the string keeper.

14. A method for using a fish-stringer handle having:
a D-shaped handle sized and shaped to be held with a hand at a leg of a D-shape of the D-shaped handle;
a channel around an outside periphery of the D-shape sized to contain a select plurality of windings of fish-stringer string;
a needle orifice in a bottom of the channel sized and shaped to contain a fish-stringer needle at a select position in the D-shaped handle with a select portion of the fish-stringer needle projecting into and through the channel; and
a fish string having a fish-stringer needle at one end and a fish-container means at an opposite end;
the method comprising the following steps:
(A) positioning the fish-stringer needle in the needle orifice;
B) winding the fish string attached to the fish-stringer needle around the outside periphery of the fish-stringer handle in the channel at least one wind;
(C) looping the fish string at least one wind around the portion of the fish-stringer needle projecting from the needle orifice in the channel; and
(D) suspending the fish string with the fish-container means in a select direction downwardly from the fish-stringer needle.

15. A method according to claim 14 wherein the direction downwardly is over a side of the channel at a side of the fish-stringer handle.

16. A method according to claim 14 wherein the direction downwardly is linear to axis of the channel with the end of the fish string having a fish-container means hanging perpendicularly to the axis of the channel at the outside periphery of the D-shape of the fish-stringer handle.

17. A method for using a fish-stringer handle having:
a D-shaped handle sized and shaped to be held with a hand at a leg of a D-shape of the D-shaped handle;
a channel around an outside periphery of the D-shape sized to contain a select plurality of windings of fish-stringer string;
a needle orifice in a bottom of the channel sized and shaped to contain a fish-stringer needle at a select position in the D-shaped handle with a select portion of the fish-stringer needle projecting into and through the channel;
a string-keeper base on the curve of the D-shape of the D-shaped handle;
a string-keeper appendage extended from the string-keeper base a select distance outwardly from the channel;
a string keeper extended from the string-keeper appendage perpendicularly to an axis of the channel proximate midway between opposite ends of the leg of the D-shaped handle such that weight of fish on a distal end of a string wound on the fish-stringer handle and resting on the string keeper is supportable perpendicularly from a central portion of the leg of the D-shape of the D-shaped handle;

the D-shape of the D-shaped fish-stringer handle being sufficiently large in proportion to material with which it is constructed for containing the string-keeper base and for supporting desired weight on the string keeper; and a fish string having a fish-stringer needle at one end and a fish-container means at an opposite end;

the method comprising the following steps:

(A) positioning the fish-stringer needle in the needle orifice;

(B) winding the fish string attached to the fish-stringer needle around the outside periphery of the fish-stringer handle in the channel at least one wind;

(C) looping the fish string at least one wind around the portion of the fish-stringer needle projecting from the needle orifice in the channel;

(D) winding the fish string further around the fish-stringer handle in the channel to the string-keeper base; and (E) suspending the fish string with the fish-container means downwardly from the string keeper in a direction perpendicular to the leg of the D-shape of the D-shaped fish-stringer handle.

* * * * *